April 10, 1928.
A. F. REITZ
1,665,564
COMBINATION DILATOR AND APPLICATOR APPLIANCE
Filed Oct. 4, 1926
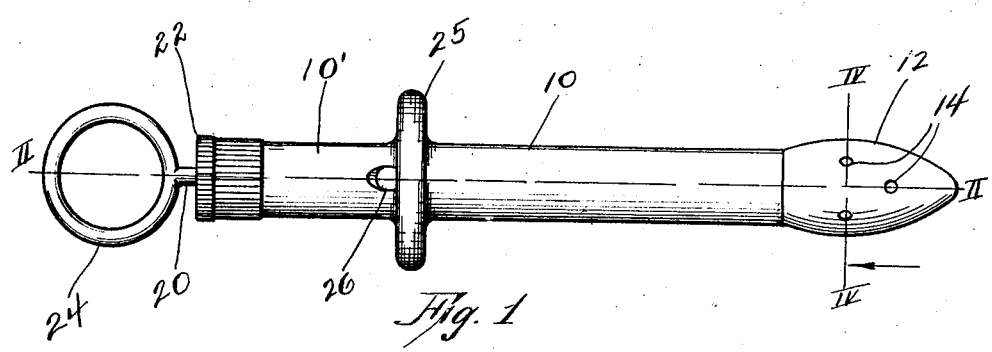
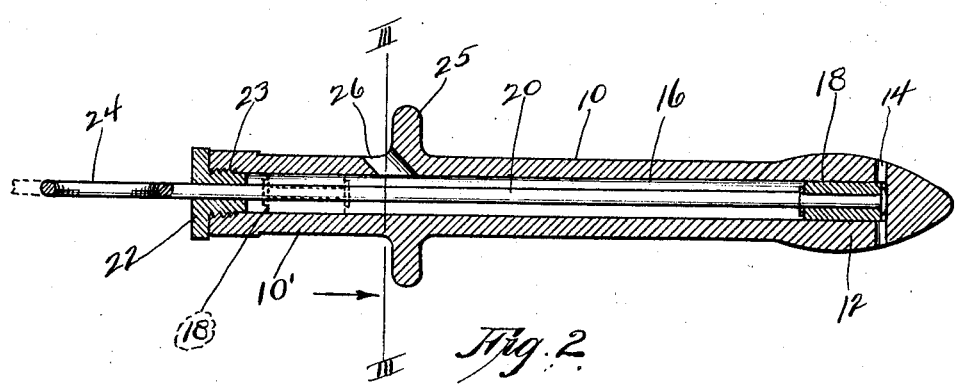
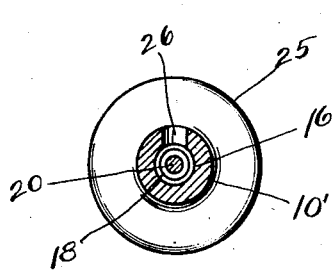
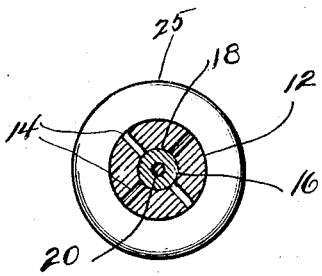
INVENTOR.
A. F. Reitz
BY
ATTORNEYS.

Patented Apr. 10, 1928.

1,665,564

UNITED STATES PATENT OFFICE.

ALBERT F. REITZ, OF KANSAS CITY, MISSOURI.

COMBINATION DILATOR AND APPLICATOR APPLIANCE.

Application filed October 4, 1926. Serial No. 139,376.

The present invention relates to therapeutic devices, and aims to provide an improved appliance of this character having a combined dilator and applicator function, for which purpose one extremity of the appliance is formed with orifices for the discharge of the medicinal substance to be applied.

For carrying out the invention in practice I have devised an appliance of this character comprising a tube or casing of dilator form provided with the discharge orifices at one end, and also with a plunger for effecting the discharge of the medicinal material in the usual manner and also with a suitable feed opening whereby the appliance may be charged conveniently with the medicinal material when the plunger is in its retracted position.

It is also sought to devise a simple, durable and conveniently operated appliance, which will be economical to manufacture, and of a minimum number of parts which will not be easily gotten out of order.

With the foregoing general object in view, the invention will now be described by reference to the accompanying drawing illustrating one form of construction which I have devised for embodying the proposed improvement, after which those features deemed to be novel will be particularly set forth and claimed.

In the drawing—

Figure 1 is a plan view of a dilator and applicator appliance constructed in accordance with the present invention;

Figure 2 is a longitudinal sectional view, taken on the line II—II of Figure 1;

Figure 3 is a transverse section taken on the line III—III of Figure 2; and

Figure 4 is a transverse section taken on the line IV—IV of Figure 1.

Referring now to the drawing in detail, this illustrates my improved appliance as embodied in a hollow dilator casing 10 having a slightly enlarged oval portion 12 at one extremity thereof, which enlarged portion 12 is formed with a series of discharge orifices 14 adapted for the discharge of the medicinal substance designed to be applied by the operation of the appliance in conjunction with its operation as a dilator in those treatments where a combined dilator and applicator function is deemed advisable. Operating within the bore 16 of the casing 10 is a suitable plunger device 18 of any suitable construction carried by one end of a plunger rod 20, the other end of which is adapted to be slidingly operated through a cap or closure plug 22 which is screw-fitted within the open end of the dilator casing, as indicated at 23 in Figure 2. The outer end of the plunger rod 20 is provided with a suitable handle 24, as shown in both Figures 1 and 2.

Intermediate its ends the dilator casing 10 is formed with an external annular flange 25 at some distance from the closure member 22, for suitably limiting the application of the appliance into its operative position, and leaving the handle portion 10' at this end of the appliance for facilitating the manipulation of the device by the operator.

Adjacent to the flange portion 25, the casing is also formed with a suitable feed opening or passage 26, which is located forward of the rearmost or retracted position of the plunger 18, as represented by the dotted lines in Figure 2. This passage 26 permits the charging of the interior of the appliance with the medicinal substance which is to be ejected from the openings 14 by the action of the plunger 18, which charging operation may be conveniently carried out by presenting the nozzle of a collapsible tube or the like containing the medicinal material to the mouth of the passage 26, and thereupon forcing said material into the bore 16 of the appliance, in a well understood manner.

It will thus be apparent that I have devised a practical and efficient appliance for carrying out the desired objects of the invention, and the method of use of the same will be obvious from the disclosure in Figure 2. In the retracted position of the plunger 18, as represented by the dotted line position in said view, the appliance may be quickly and conveniently charged with a suitable quantity of the medicinal substance to be applied to the parts undergoing treatment, whereupon the action of the plunger by manipulation of the handle 24, will effectively discharge the contents of the appliance through the orifices 14 into direct contact with the parts. It is apparent that the appliance is adapted for the effective treatment of piles and colon troubles, as well as for the treatment of prostate gland, or for ovarian afflictions of women. The appliance is of simple and compact construction, adapted for very convenient operation, and having practically no parts that are likely to get out of order.

While I have illustrated what is now regarded as the preferred form of construction, I desire to reserve the right to make such changes or modifications as may fairly fall within the scope of the appended claims.

What I claim is:

1. A dilator comprising a hollow casing enlarged at one end and provided with openings through said enlarged end, and a plunger within said casing and having an operating rod projecting from the other end of the casing, said casing being formed intermediate its ends with an external annular flange and also having a feed opening rearward of said flange and forward of the retracted position of the plunger.

2. An applicator comprising a hollow casing having an opening at one end, and a plunger within said casing and having an operating rod projecting from the other end of the casing, said casing being formed intermediate its ends with an external annular flange and also having a downwardly and forwardly inclined feed opening immediately adjacent the rear side of said flange and forward of the retracted position of the plunger.

In witness whereof I hereunto affix my signature.

ALBERT F. REITZ.